Sept. 11, 1951     L. A. DE ROSA ET AL     2,567,193
INDICATOR FOR DIRECTION FINDERS
Filed Aug. 7, 1945     2 Sheets—Sheet 1
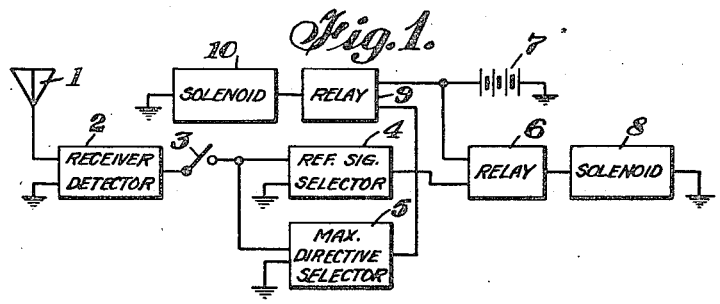
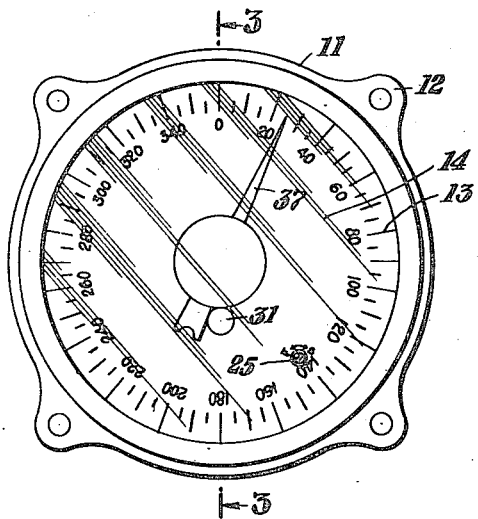
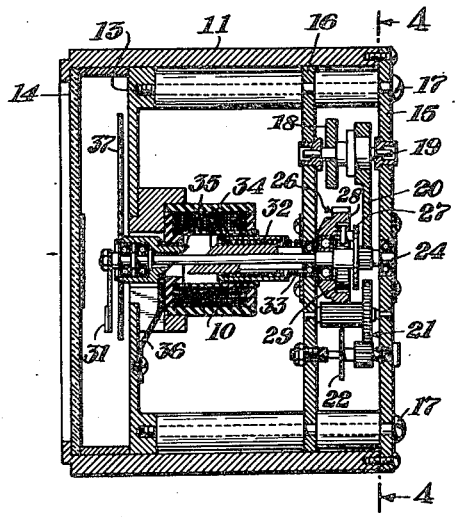
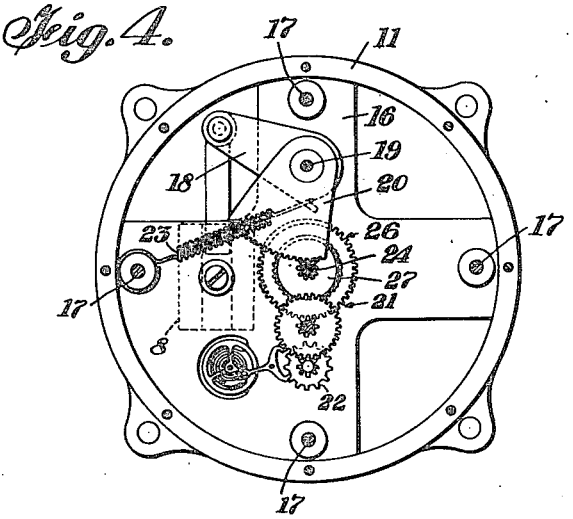
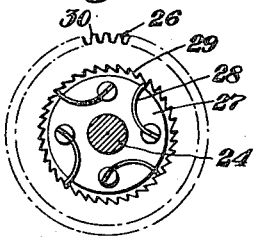
INVENTORS.
LOUIS A. DE ROSA
BERNARD HOWARD
BY
*Percy P. Lantry*
ATTORNEY

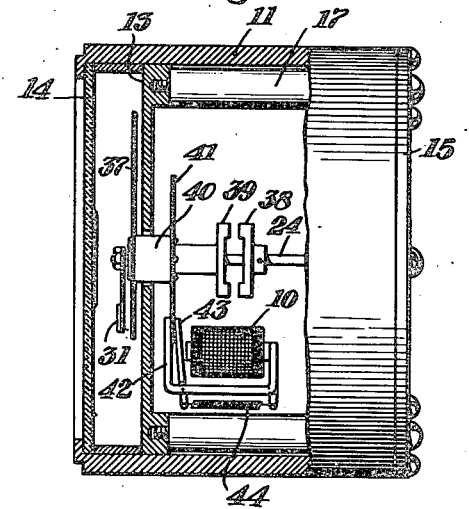
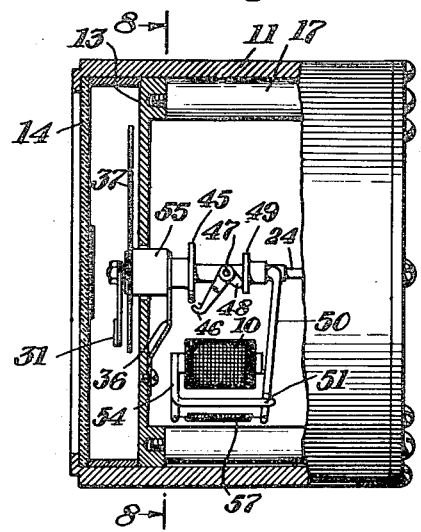
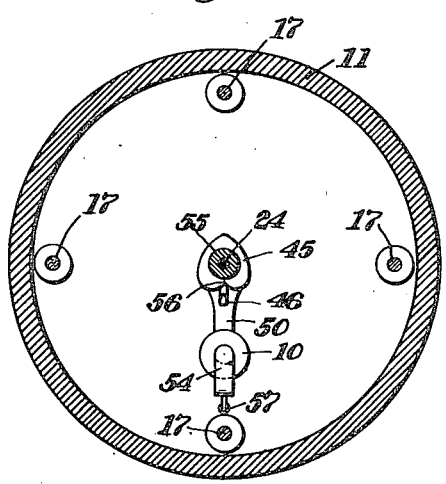
INVENTORS.
LOUIS A. DE ROSA
BERNARD HOWARD

Patented Sept. 11, 1951

2,567,193

UNITED STATES PATENT OFFICE 2,567,193

INDICATOR FOR DIRECTION FINDERS

Louis A. de Rosa, Bloomfield, N. J., and Bernard Howard, Smithtown, N. Y., assignors to Federal Telephone and Radio Corporation, New York, N. Y., a corporation of Delaware Application August 7, 1945, Serial No. 609,479

4 Claims. (Cl. 343—106)

This invention relates to a direction indicator and mechanism for operating it. More particularly, it deals with a direct reading time recording type of direction indicator which may be mounted on the instrument panel of an airship or other vehicle and which is responsive to radio direction signals.

One of the present methods of transmitting radio direction signals comprises the transmission of two different types of signals synchronized with each other, one of which is a reference direction signal and may be an intermittent and omnidirectional, and the other a continuous unidirectional rotating signal such as is transmitted from a rotating radio beacon. These signals are synchronized so that every time the rotating direction beacon points in the reference direction (such as for example, true north) the omnidirectional reference signal is transmitted. The frequency of rotation of the beacon is usually about one minute. In order to distinguish between the two signals, they may be of different frequency, modulation, amplitude, length or the like.

Previously, these radio signals were received and converted to audible signals. When a pilot in a plane heard the omnidirectional reference tone signal, he would start his stopwatch, and stop it when he heard the different and maximum tone from the rotating radio beacon. In order to eliminate calculation, the stopwatch may be calibrated in degrees of azimuth so that the angle of the pilot's plane with respect to the reference direction may be directly indicated. This procedure is distracting to the pilot, repetitious, and not very accurate due to the human element involved in measuring the timing between the two different audible signals.

It is an object of this invention to provide a simple, accurate, direct-reading, efficient, automatic direction indicator for a vehicle.

Another object is to record continuously the variations in intermittent radio direction signals.

Another object is to provide a clock mechanism for a direction indicator which is actuated by an omnidirectional radio signal and which runs in synchronism with the frequency of that signal.

Another object is to provide a direct-reading direction indicator based on the time relationship between two different directional radio signals, one signal being used to start a motor which runs in synchronism with the cycle of the second signal.

Another object is to provide a simple accurate clutch engaging means which may be employed between the indicating arm and a spring motor of an intermittent time recording direction indicator.

Another object is to provide a simple, accurate, positive, quick-acting, cam mechanism which may be used for intermittently aligning a continuous indicating means according to phase changes in a continuously moving clock mechanism.

Another object is to provide a clock mechanism for automatically indicating the time direction relationship between an omnidirectional reference radio signal and the maximum signal from a rotating direction radio beacon.

Still other objects and features of this invention will appear from time to time in the following description.

The direction finder of this invention comprises: a first means responsive to an intermittent reference radio directional signal; a second means responsive to a different type of radio directional signal, such as one from a rotating directional radio beacon; an indicating dial; a clock mechanism; a means to start said clock in response to the reference radio signal; and a means cooperating with the clock mechanism and actuated by the direction signal from the radio beacon to directly indicate the direction on the dial of the vehicle with respect to the reference direction. The indicator dial may comprise an azimuth scale graduated in degrees from reference direction. The clock mechanism may comprise gears, a clutch, an escapement mechanism, and a motor such as a spring, which may be started by the action of a solenoid controlled by the reference signal. This clock is synchronized with both the frequency of the reference signal and rotation of the radio beacon, so that one indicator on the dial makes one revolution each time the direction beacon makes one revolution. A "heart-shaped" or similarly acting cam having a definite engaging position, is rotated by the clock mechanism and cooperates with a cam follower intermittently engaged with the cam at the time the direction signal from the rotating radio beacon is received. Fixed on the cam follower is an indicator, such as an arrow pointer. This pointer continuously points one direction on the dial, until it is changed by a different direction signal operating the cam follower at a different time phase relationship to the regular cyclic rotation of the clock.

A better understanding of this invention and the objects and features thereof may be had from a particular description of an embodiment thereof made with reference to the accompanying drawings in which:

Fig. 1 is a block wiring diagram of the electronic circuit for operating the indicator of this invention;

Fig. 2 is a front view of the indicator showing its dial and pointer;

Fig. 3 is a sectional side view of the mechanism of the indicator taken along line 3—3 of Fig. 2;

Fig. 4 is a rear view of the clock mechanism taken along line 4—4 of Fig. 3;

Fig. 5 is an enlarged plan view of the clutch mechanism employed in the clock mechanism showed in Fig. 4;

Figs. 6 and 7 are sectional views similar to Fig. 3 of other embodiments of the mechanism of the indicator; and Fig. 8 is a sectional view taken along the line 8—8 of Fig. 7.

Referring to Fig. 1 the radio signals, whose impulses are used in operating the direction finder indicator of this invention, are received over antenna 1, pass through the received-detector 2, and then through off-and-on switch 3 into either the reference signal selector 4 or the maximum directive signal selector 5. In this type of a device, an omnidirectional reference signal is transmitted, say, once every minute, and a directional radio beacon is rotated so as to make one complete rotation every minute. These two signals are different in some characteristic so that they can be separated in the selectors 4 and 5. The omnidirectional signal impulse is transmitted to operate the relay 6 and to close a switch between the battery 7 and the solenoid 8, which starts the clock mechanism in the indicator. The maximum beacon directional signal impulse is transmitted through the selector 5 to operate the relay 9 and to close a switch between the battery 7 and the solenoid 10 which operates the cam follower and positions the pointer on the dial to indicate the direction.

Referring to Figs. 2, 3 and 4 of the indicator, the embodiment herein discloses a cylindrical housing 11 provided with flanges 12 for mounting it on the instrument panel of a vehicle. Near the front end of the housing 11 is a circular dial 13 protected by a suitable transparent covering, such as a glass window, spaced a suitable distance from the dial 13. The back of the housing is covered with a circular plate 15. Intermediate the dial 13 and plate 15 is mounted an intermediate supporting plate 16. The dial 13 and plate 16 are mounted on the back plate 15 by suitable posts 17. The clock mechanism is mounted between plates 15 and 16. The solenoids 8 and 10 are mounted in the space between the plate 16 and dial 13. Solenoid 8 is shown in dotted lines behind plate 16 in Fig. 4.

Referring now to Fig. 4 the armature of solenoid 8 is connected to the bell crank lever 18 pivoted on shaft 19. Directly connected with the lever 18 is sector gear 20 which drives the clock mechanism through suitable gears 21. Spring motor 23 which runs the clock mechanism is connected between the sector gear 20 and one of the columns 17, and is tensioned when the solenoid 8 is energized. The escapement mechanism 22 of the clock is constructed so that the shaft 24 rotates in synchronism with the rotation of the direction signal beacon; in this case stated to be one revolution per minute. The speed of escapement 22 may be adjusted by screw 25 shown on the dial 13 in Fig. 2.

Mounted around the shaft 24 is a clutch mechanism 26 more clearly shown in detail in Fig. 5. This clutch mechanism comprises a gear and sleeve 27 directly cooperating with the sector gear 20. Mounted on the sleeve 27 is a plurality of resilient or spring members 28 for cooperating with the knurled section 29 on the inside cylindrical surface of the drum 30 of the clutch 26. The outside cylindrical surface of drum 30 is provided with an outside gear for cooperation with one of the gears 21. The spring members 28 only engage the knurled portion 29 when rotating in one direction thus presenting a reverse direction spin of the gears 21 when the sector gear is tuned by the solenoid 8. The spacing of the spring members 28 around the sleeve 27 in relation to the spacing between two adjacent knurled depressions may be such that only one of the four members engages in a depression at any one time. This enables a much closer adjustment and less slipping of clutching mechanism 26 than could be obtained with just one resilient member 28.

The shaft 24 extends axially through the cylindrical housing 11 and through plate 16 and dial 13. On the dial end of the shaft 24 may be mounted an indicator 31 which rotates to show when the clock mechanism is in operation. The device is so constructed and so adjusted that the indicator 31 will be at zero position on the dial, shown in Fig. 2, when the omnidirectional reference signal is given.

Surrounding the shaft 24 between the dial 13 and the plate 16 is an axially slidably rotating cam 32 rotating with shaft 24 comprising a truncated cylindrical sleeve wherein the truncated end 34 is the cam engaging face. This sleeve is the armature of solenoid 10 which rotates with the shaft 24, and is urged toward the plate 16 out of engagement with its cam follower 35 by means of spring 33. When cam 32 is instantaneously actuated by energization of the solenoid 10 its face 34 cooperates with the cam face of the cam follower 35, which is a truncated cylindrical sleeve member similar to cam 32 but is not fixed to rotate with the shaft 24. Spring means 36 which frictionally engages a shoulder of cam follower 35 may be employed to prevent the cam follower 35 from rotating with shaft 24 and to maintain its position, until moved by the action of solenoid 10 and engagement with cam 32. Mounted on the cam follower 35 is an arrow pointer 37 which points to the divisions on the dial 13 to continuously indicate the true direction. Pointer 37 remains in one set position until it is changed by a different phase relation between the actuating signals for the solenoids 8 and 10.

The indicator of this invention directly measures the time space relationship between an omnidirectional reference signal and a direcnional beacon signal, and may be calibrated to indicate directly the angle of this incoming signal to the direction of the vehicle, or to the reference direction.

The arc of the sector gear 20 is of such a length that any one winding of the clock mechanism for tensioning the spring 23 by actuation of the solenoid 8, will cause the shaft 24 and indicator 31 to make one exact revolution from the zero or reference direction position on the dial 13, around 360° to the same position. Thus, before each reference signal is received or when switch 3 is in its "off position," the indicator 31 will point to the zero or reference direction on the dial 13.

Other embodiments of the mechanism for the indicator are shown in Figs. 6, 7 and 8.

In the Fig. 6 the mechanism for connecting the pointer 37 with the shaft 24 comprises two permanent magnets 38 and 39. The magnet 39 is fixedly mounted on the sleeve 40 surrounding the shaft 24, but is free to rotate independently thereof. Also on sleeve 40 is fixedly mounted the pointer 37 and a disc 41. The disc 41 is ordinarily clamped between the stationary jaw 42 and the movable jaw 43 by means of spring 44. Jaw 43 is part of the armature for the solenoid 10. Thus, the pointer 37 is held in a fixed position except when a directional signal is received and solenoid 10 is instantaneously energized. At this time, the armature 43 is pulled away from the jaw 42, so that magnet 39 may turn to its definite position of highest magnetic flux with respect to magnet 38, thereby also turning the pointer 37 to indicate the direction of the signal on the dial 13.

Figs. 7 and 8 show a further embodiment of the mechanism operated by the solenoid 10, which comprises a "heart-shaped" cam 45 and cam follower 46. The cam follower 46 is pivotally mounted at 47 on shaft 24 and has bell crank lever 48 for cooperation with an axially slidable sleeve 49 surrounding the shaft 24. Sleeve 48 is urged to engage lever 48 by the fork 50, pivoted at 51 to part of the support 54 of the solenoid 10. The fork 50 acts as part of the armature for the solenoid 10. The "heart-shaped" cam 45 (better shown in Fig. 8) is fixedly mounted on the sleeve 55 surrounding the shaft 24 and independently rotatable thereon. Also fixedly mounted on sleeve 55 is the pointer 37. Engaging a shoulder of the sleeve 55 is a spring 36 to frictionally hold the pointer 37 and sleeve 55 in any set position. When the solenoid 10 is instantaneously energized the armature 50 against the tension of spring 57, forces the sleeve 49 against the bell crank lever 48 which in turn forces the cam follower 46 down against the heart-shaped cam 45. This causes the cam 45 to turn to its definite and minimum position 56 (see Fig. 8) and thus turns the pointer 37 to the direction corresponding with the direction of the signal which energized solenoid 10.

Although the above description is limited to a direction indicator, the principle and mechanism thereof may be applied to continuously and automatically record or indicate any change in the time phase relationship between two series of synchronized cyclic impulses. Thus, this description is merely made by way of example and not as a limitation on the scope of this invention as defined in the objects and the accompanying claims.

We claim:

1. A directional indicating receiver for use with an omnidirectional beacon of the type which transmits a given directive signal rotatably in different angular positions around said beacon and a given omnidirectional reference signal when said directive signal is aligned in a predetermined reference direction comprising: means for receiving and separately selecting said directive signals and said reference signals, an azimuth dial, a spring actuated cloth mechanism, means for tensioning said spring actuated by said reference signal, a cam, means to rotate said cam in synchronism with the rotation of said directive signal, a cam follower, means actuated by said directive signal to instantaneously engage said cam follower and said cam, and indicating means connected to said dial the direction of the received directive signal.

2. An indicator means for directly recording and the difference and change and phase between two different cyclic impulses having the same frequency, said indicator comprising: an indication dial, a timing mechanism actuated by one of said impulses, a cam rotated by said timing mechanism in synchronism with the frequency of said impulses and comprising a truncated cylinder, a cam follower comprising: a similar truncated cylinder axially aligned with said cam, means actuated by the other of said impulses to engage the truncated surfaces of said cam follower and said cam, and indicating means connected to said cam follower for indicating the time change in phase between said impulses.

3. An indicator means for directly recording the difference and change in phase between two different cyclic impulses having the same frequency comprising: an indicator dial, a timing mechanism actuated by one of said impulses, a permanent magnet rotated by said timing mechanism in synchronism with the frequency of said impulses, the second permanent magnet similar to the first permanent magnet and rotatably mounted to cooperate therewith, said second magnet being held in a stationary position except when said other impulse is received, at which time it is instantaneously permitted to rotate to the position of said first permanent magnet, and an indicating means connected to the second permanent magnet for indicating the time change in phase between said impulses.

4. An indicator means for directly recording the difference and change in phase between two different cyclic impulses having the same frequency, said indicator comprising: an indication dial, timing mechanism actuated by one of said impulses, a truncated cylindrical cam rotated by said timing mechanism in synchronism with the frequency of said impulses, a clutch mechanism for connecting said cam with said timing mechanism, a cam follower, comprising: a similar truncated cylinder axially aligned with said cam, means actuated by the other of said impulses to engage the truncated surfaces of said cam follower and said cam, and indicating means connected to said cam follower for indicating the time change in phase between said impulses; said clutch mechanism comprising: a drum having a knurled cylindrical surface, a plurality of spring followers mounted on a sleeve coaxial with said drum, said follower capable of engaging the knurls on said drum to turn the drum when the sleeve is rotated in one direction and disengaging said knurls when the sleeve is rotated in opposite direction.

LOUIS A. DE ROSA.
BERNARD HOWARD.

REFERENCES CITED

The following references are of record in the file of this patent:

UNITED STATES PATENTS

| Number | Name | Date |
|---|---|---|
| 1,135,604 | Meissner | Apr. 13, 1915 |
| 1,748,797 | Russell | Feb. 25, 1930 |
| 2,084,845 | Holmes | June 22, 1937 |
| 2,252,699 | Byrne | Aug. 19, 1941 |
| 2,260,347 | Sproule | Oct. 28, 1941 |
| 2,317,740 | Delvin | Apr. 27, 1943 |
| 2,326,880 | Norrman | Aug. 17, 1943 |
| 2,379,771 | Weidauer | July 3, 1945 |
| 2,394,286 | Blaisdell | Feb. 5, 1946 |
| 2,396,985 | Burrus | Mar. 19, 1946 |
| 2,398,015 | Leathers | Apr. 9, 1946 |
| 2,402,410 | Kear | June 18, 1946 |
| 2,403,626 | Wolff | July 9, 1946 |
| 2,407,099 | Richards | Sept. 3, 1946 |

FOREIGN PATENTS

| Number | Country | Date |
|---|---|---|
| 317,826 | Great Britain | May 29, 1930 |
| 541,680 | Great Britain | Dec. 8, 1941 |